United States Patent
Shinchi et al.

(10) Patent No.: US 8,673,991 B2
(45) Date of Patent: Mar. 18, 2014

(54) TWO-PART CURABLE POLYURETHANE FOAM RESIN COMPOSITION, MOLDED ARTICLE USING THE SAME, AND SHOE SOLE

(75) Inventors: Tomoaki Shinchi, Osaka (JP); Hiroshi Suzaki, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/580,540

(22) PCT Filed: Mar. 22, 2011

(86) PCT No.: PCT/JP2011/056713
§ 371 (c)(1),
(2), (4) Date: Dec. 21, 2012

(87) PCT Pub. No.: WO2011/132490
PCT Pub. Date: Oct. 27, 2011

(65) Prior Publication Data
US 2013/0102697 A1    Apr. 25, 2013

(30) Foreign Application Priority Data

Apr. 22, 2010 (JP) .................................. 2010-98746

(51) Int. Cl.
*C08G 18/28* (2006.01)

(52) U.S. Cl.
USPC ........... 521/159; 521/130; 521/170; 521/172; 521/173; 521/174

(58) Field of Classification Search
USPC .................. 521/130, 159, 170, 172, 173, 174
See application file for complete search history.

(56) References Cited

U.S. PATENT DOCUMENTS 7,138,175 B2 * 11/2006 Saito .......................... 428/304.4
7,138,437 B2 * 11/2006 Giorgini et al. ............... 521/101
7,598,336 B2 * 10/2009 Fukuda et al. ............... 528/74.5
7,781,513 B2 * 8/2010 Lucas et al. .................... 524/507
2009/0264547 A1    10/2009 Klesczewski et al.

FOREIGN PATENT DOCUMENTS

| JP | 04-164914 A | 6/1992 |
| JP | 2003-096293 A | 4/2003 |
| JP | 2008-013764 A | 1/2008 |
| JP | 2008-280447 A | 11/2008 |
| JP | 2009-035617 A | 2/2009 |
| JP | 2010-174111 A | 8/2010 |
| JP | 2010-275425 A | 12/2010 |
| WO | 2010/106240 A1 | 9/2010 |

OTHER PUBLICATIONS

International Search Report of PCT/JP2011/056713, mailing date of Jul. 12, 2011.

* cited by examiner

*Primary Examiner* — John Cooney
(74) *Attorney, Agent, or Firm* — Westerman, Hattori, Daniels & Adrian, LLP

(57) ABSTRACT

The two-part curable polyurethane foam resin composition uses little or no petroleum-derived raw materials but a plant-derived raw material so that the biomass ratio can be improved, the load on the environment can be reduced, and excellent physical characteristics can be exhibited. The two-part curable polyurethane foam resin composition includes a main agent that contains an isocyanate-terminated urethane prepolymer (A) and a curing agent that contains an isocyanate-reactive compound (B), water (C), and a catalyst (D), in which a polyol component used in (A) and (B) uses a castor oil polyol (b1) having 1.5 to 2.3 functional groups on average and a polyol (b2) prepared by addition polymerization of lactone to polytetramethylene glycol and/or polytetramethylene glycol (b3), the ratio (b1)/(b2) and/or (b3)=15/85 to 60/40 on a mass basis, and a content of the castor oil polyol (b1) is 10 to 45% by mass.

9 Claims, No Drawings

TWO-PART CURABLE POLYURETHANE FOAM RESIN COMPOSITION, MOLDED ARTICLE USING THE SAME, AND SHOE SOLE

TECHNICAL FIELD

The present invention relates to a two-part liquid polyurethane foam resin composition, a molded article using the composition, and a shoe sole. In particular, it relates to a two-part liquid polyurethane foam resin composition that uses a polyurethane resin having a high plant-derived material content (biomass ratio) and that does not damage the global environment and human bodies, a molded article using the composition, and a shoe sole.

BACKGROUND ART

There are a variety of types of footwear such as men's leather shoes, women's leather shoes, sport shoes, campus shoes, women's chemical shoes, men's chemical shoes, Hepburn sandals, medical shoes, and safety shoes. Natural and synthetic materials such as leather, rubber, polybutadiene materials, polyvinyl chloride materials, polyurethane materials, and polyester materials are widely used as raw materials for shoe soles of such footwear.

Among these materials, polyurethane foam (cellular polyurethane elastomer) surpasses other materials in terms of lightweightness, mechanical strength, wear resistance, bending resistance, chemical resistance, anti-slip property, cold-resistance, moldability, etc., and is thus used in a wide variety of applications.

However, recently, the shoe sole market inside and outside Japan is maturing rapidly. In the footwear industry, various attempts have been actively made to increase the added value, such as imparting various properties to footwear to improve foot comfort and enhancing ecological benefits (environmental conservation measures), e.g., reduction in $CO_2$ emission when products are discarded and incinerated and facilitating recycling of the products.

Vast quantities of petroleum-derived materials are presently used as the main material of polyurethane foam resin compositions for shoe sole applications. Since there is a concern that this may pose a problem in terms of environmental conservation in the future, measures have to be taken to avoid the problem.

Meanwhile, the problem of future depletion of petroleum resources is gathering much attention. A trend toward relying more on biomass materials such as plant-derived materials and less on conventional products that use petroleum-derived materials is quickly emerging. In the polyurethane foam industry also, use of biomass materials such as polyol components extracted or purified from castor oil and soy beans is highly anticipated.

Recently, regarding the use of biomass materials produced from biomass raw materials, Japan BioPlastics Association (JBPA) has established an identification system for biomass plastics which are biomass plastic products containing a particular amount or more of organic source (plants etc.)—derived substances as a plastic component in order to make consumers take due account of the importance of preventing global warming and reducing the consumption of petroleum resources. Under this system, products that comply with the standards set by the association are certified as "Biomass Pla" and are authorized to use a logo so that general consumers can easily identify the biomass plastic products.

In order to obtain authorization for biomass pla identification, the "biomass plastic ratio" of the product (the ratio of the biomass-derived components in the product relative to the total amount of the product) needs to be 25% by mass or more. Increasing the biomass plastic ratio in the product (at least 25% by mass) is very important for reducing the impact of the products on the environment. Obtaining a biomass pla certification mark will become essential from the viewpoint of increasing the awareness of the need to reduce the environmental impact for reducing environmental impact for both manufacturers and consumers.

In order to reduce the impact on the environment, various proposals have been made regarding two-part liquid polyurethane foam resin compositions that use a plant-derived material, namely, a castor oil polyol, instead of conventional petroleum-derived raw materials, and regarding molded articles made using such compositions.

A known example of a polyurethane foam made of a polyurethane raw material containing a polyol, a polyisocyanate, a blowing agent, and a catalyst is a soft polyurethane foam that uses both a polyol having two to four functional groups and being composed of a fatty acid and an ester condensate of a polyfunctional glycol, and a polyol which is a polyether polyol having a polyoxyalkylene chain and which contains 45% to 85% of ethylene oxide in the polyoxyalkylene chain, in which at least toluene diisocyanate is used as the polyisocyanate. This soft polyurethane foam uses a castor oil polyol as the polyol having two to four functional groups and is reported to exhibit low hardness, low strain, and good breathability (for example, refer to PTL 1).

However, the soft polyurethane foam described in PTL 1 has a low hardness and insufficient strength and has a problem in that shoe soles made from the soft polyurethane are lacking in comfort. There is another problem in that the strength is insufficient for use in industrial components such as packings, hoses, sheets, and cushioning materials, decoration cushioning components such as furniture and mattresses, packaging components, and vehicle components such as vehicle bumpers.

An example of a polyurethane foam obtained by mechanical stirring foaming of a polyurethane raw material containing a polyol component and an isocyanate component is a polyurethane foam that contains a castor-oil-modified polyol having a hydroxyl value of 80 to 360 mg/KOH and an average functional group number of 2.5 to 6 as a polyol component and at least one selected from a modified tolylene diisocyanate (modified TDI), a modified diphenyl methane diisocyanate (modified MDI), and modified hexamethylene diisocyanate (modified HDI) having a NCO content of 1 to 15% as the isocyanate component. This polyurethane foam has low hardness and low permanent set and a conductive roller using such a foam in an elastic layer has been reported to prevent occurrence of contact marks, effectively preventing the occurrence of image defects caused by the contact marks, and reliably form high-quality images (refer to PTL 2).

However, since the average functional group number of the castor oil polyol used in the polyurethane foam described in PTL 2 is as large as 2.5 to 6 and the flexibility is thus low, there has been a problem in that cracking occurs in an article, such as a shoe sole, which is repeatedly subjected to bending.

A two-part liquid cellular polyurethane foam elastomer composition for shoe soles, the composition containing an organic polyisocyanate and a polyol prepared by addition polymerization of lactone to polyoxytetramethylene glycol is also known. This two-part liquid cellular polyurethane elastomer composition for shoe soles has mechanical strength (tensile strength and tear strength) and water resistance and exhibits good bending resistance, wear resistance, and mold resistance. It is thus reported that this composition is suitable for use in soles of sport shoes such as jogging and tennis shoes, high-grade men's leather shoes, and safety shoes (for example, refer to PTL 3).

However, the two-part liquid cellular polyurethane foam elastomer composition for use in shoe soles described in PTL 3 uses petroleum-derived raw materials and has a high impact on the environment, possibly posing a problem regarding environmental conservation.

As discussed above, in order to reduce impact on the environment, there has been a high anticipation on development of a two-part liquid polyurethane resin composition that uses little or no conventional petroleum-derived raw materials but uses a plant-derived raw material to improve the biomass ratio and reduce the environmental impact while exhibiting excellent physical properties (strength, elongation, flexibility, dimensional stability, and wear resistance), a molded article using the composition, and a shoe sole.

CITATION LIST

Patent Literature

PTL 1: Japanese Unexamined Patent Application Publication No. 2009-035617
PTL 2: Japanese Unexamined Patent Application Publication No. 2008-280447
PTL 3: Japanese Unexamined Patent Application Publication No. 4-164914

SUMMARY OF INVENTION

Technical Problem

An object of the present invention is to provide a two-part curable polyurethane foam resin composition that uses little or no petroleum-derived raw materials conventionally used but uses a castor oil polyol as a plant-derived raw material so that the biomass ratio is improved, the impact on the environment can be reduced, and excellent physical properties (strength, elongation, flexibility, and dimensional stability) can be exhibited, a molded article using the composition, and a shoe sole.

Solution to Problem

The inventors of the present invention conducted extensive studies to achieve the object and found that a two-part curable polyurethane foam resin composition that has an improved biomass ratio, lower impact on the environment, and excellent physical characteristics (strength, elongation, flexibility, dimensional stability, and wear resistance) can be obtained when the two-part curable polyurethane foam resin composition includes a main agent that contains an isocyanate-terminated urethane prepolymer and a curing agent that contains an isocyanate-reactive compound, water, and a catalyst, in which a polyol component used in the urethane prepolymer and the isocyanate-reactive compound constituting the two-part curable polyurethane foam resin composition contains, at a particular mass ratio, a castor oil polyol having an average number of functional groups within a particular range and a polyol prepared by addition polymerization of lactone to polytetramethylene glycol and/or polytetramethylene glycol, and a content of the castor oil polyol is in a particular range.

The inventors have also found that a molded article and a shoe sole can be obtained by using the composition and made the invention.

In other words, the present invention relates to a two-part curable polyurethane foam resin composition including a main agent that contains an isocyanate-terminated urethane prepolymer (A) and a curing agent that contains an isocyanate-reactive compound (B), water (C), and a catalyst (D), wherein a polyol component used in (A) and (B) uses a castor oil polyol (b1) having 1.5 to 2.3 functional groups on average and a polyol (b2) prepared by addition polymerization of lactone to polytetramethylene glycol and/or polytetramethylene glycol (b3), the ratio (b1)/(b2) and/or (b3)=15/85 to 60/40 on a mass basis, and a content of the castor oil polyol (b1) is 10 to 45% by mass.

The present invention also relates to a molded article produced from the two-part curable polyurethane foam resin composition described above.

The present invention further relates to a shoe sole formed by using the two-part curable polyurethane foam resin composition described above, in which the density is in the range of 0.3 to 1.0 g/cm$^3$.

Advantageous Effects of Invention

Since a two-part curable polyurethane foam resin composition according to the present invention uses little or no petroleum-derived raw materials conventionally used and a plant-derived raw material, i.e., a particular castor oil polyol, is used in both a main agent, i.e., an isocyanate-terminated urethane prepolymer (A), and a curing agent, i.e., an isocyanate-reactive compound (B), the biomass ratio can be improved, impact on the environment can be reduced, and excellent physical properties (strength, elongation, flexibility, dimensional stability, wear resistance, etc.) are exhibited when used in combination with polytetramethylene glycol. Accordingly, for example, the composition can be applied to various types of molded articles, e.g., shoe soles of various types of footwear such as jogging shoes, sport shoes, chemical shoes, sandals, men's leather shoes, women's leather shoes, student shoes, medical shoes, and safety shoes, industrial components such as packings, hoses, sheets, and cushioning materials, decoration cushioning components such as furniture and mattresses, packaging components such as wrapping materials, and vehicle components such as vehicle bumpers and shock absorbers.

DESCRIPTION OF EMBODIMENTS

First, a two-part curable polyurethane foam resin composition according to the present invention is described.

A two-part curable polyurethane foam resin composition is constituted by using a main agent containing an isocyanate-terminated urethane prepolymer (A), and a curing agent containing an isocyanate-reactive compound (B), water (C), and a catalyst (D).

In the two-part curable polyurethane foam resin composition, a polyol component used in the isocyanate-terminated urethane prepolymer (A) and the isocyanate-reactive compound (B) is a castor oil polyol (b1) derived from a plant and having an average of 1.5 to 2.3 functional groups and a polyol (b2) prepared by addition polymerization of lactone to polytetramethylene glycol and/or polytetramethylene glycol (b3). The "functional group" in the present invention refers to a hydroxyl group.

The isocyanate-terminated urethane prepolymer (A) (hereinafter referred to as "urethane prepolymer (A)") can be obtained by a common method of reacting a polyisocyanate (a1) with a polyol component, namely, either a castor oil polyol (b1) derived from a plant and having an average of 1.5 to 2.3 functional groups (hereinafter referred to as "castor oil polyol (b1)"), or the castor oil polyol (b1) and a polyol (b2) prepared by addition polymerization of lactone to polytetramethylene glycol (hereinafter simply referred to as "polyol (b2)") and/or polytetramethylene glycol (b3) (hereinafter referred to as "PTMG (b3)"). The polyol (b2) and the polyol PTMG (b3) can be used in combination.

The reaction method and the reaction conditions for obtaining the urethane prepolymer (A) are not particularly limited.

Examples of the polyisocyanate (a1) include diphenylmethane diisocyanate (MDI for short; 4,4'-isomer, 2,4'-isomer, 2,2'-isomer, or a mixture of these) and modified MDIs such as carbodiimide-modified MDI, nurate-modified MDI, biuret-modified MDI, urethaneimine-modified MDI, and polyol-modified MDI prepared by modifying MDI with a polyol, such as diethylene glycol or dipropylene glycol, having a molecular weight of 1000 or less. Other examples include aromatic diisocyanates such as carbodiimidized diphenylmethane polyisocyanate, tolylene diisocyanate (TDI-100; 2,4-isomer of toluene diisocyanate or TDI-80; a mixture of 2,4-isomer and 2,6-isomer with a 2,4-isomer/2,6-isomer ratio of 80/20 (mass), or the like), tolidine diisocyanate (TODI), polymethylene polyphenyl polyisocyanate, xylylene diisocyanate (XDI), 1,5-naphthalene diisocyanate (NDI), and tetramethylxylene diisocyanate; alicyclic diisocyanates such as isophorone diisocyanate (IPDI), hydrogenated diphenylmethane diisocyanate (hydrogenated MDI), and hydrogenated xylylene diisocyanate (hydrogenated XDI); and aliphatic diisocyanates such as hexamethylene diisocyanate, dimer acid diisocyanate, and norbornene diisocyanate. Among these, diphenylmethane diisocyanate (MDI for short; 4,4'-isomer, 2,4'-isomer, 2,2'-isomer, or a mixture of these) is preferable and 4,4'-MDI is yet more preferable. These can be used alone or in combination of two or more.

In the present invention, the castor oil polyol (b1) is preferably reacted in advance with a 4,4'-MDI and/or a modified 4,4'-MDI so as to reduce the castor oil polyol (b1) content in the isocyanate-reactive compound (B) as much as possible. As a result, favorable effects such as reduction of the time taken to mold the two-part curable polyurethane foam resin composition and improvements of dimensional stability during releasing from a mold can be achieved.

The isocyanate group equivalent (referred to as "NCO equivalent" hereinafter) in the urethane prepolymer (A) is preferably in the range of 150 to 350 and more preferably in the range of 200 to 300. When the NCO equivalent in the urethane prepolymer (A) is within this range, a large increase in viscosity can be inhibited and a urethane prepolymer that has a viscosity suitable for use in low-pressure foaming machines and high workability can be obtained.

The two-part curable polyurethane foam resin composition of the present invention is prepared by mixing two liquids using a main agent and a curing agent. The curing agent contains an isocyanate-reactive compound (B), water (C), and a catalyst (D) as essential components.

The isocyanate-reactive compound (B) uses, as an essential component, a castor oil polyol (b1) which is a plant-derived raw material and has an average of 1.5 to 2.3 functional groups. When the average number of functional groups in the castor oil polyol (b1) is within this range, a two-part curable polyurethane foam resin composition that can exhibit excellent flexibility can be obtained. For example, the composition can be used in various molded articles such as industrial components such as packings, hoses, sheets, and cushioning materials, decoration cushioning components such as furniture and mattresses, packaging components such as wrapping materials, and vehicle components such as vehicle bumpers and impact-absorbing materials as well as shoe soles of various footwear including jogging shoes, sport shoes, chemical shoes, sandals, men's leather shoes, women's leather shoes, student's shoes, medical shoes, and safety shoes.

Note that the "plant-derived raw material" referred to in the present invention is a component that can be obtained from a plant, such as ricinoleic acid obtained from castor oil. Castor oil is a pale yellow viscous non-drying oil obtained from seeds of the plant *Ricinus communis* of the Euphorbiaceae family and is an ester of glycerin and ricinoleic acid which is a fatty acid (that is, triglyceride of ricinoleic acid). In castor oil, ricinoleic acid accounts for about 90% of the fatty acid and a hydroxyl group, a double bond, and an ester bond are contained in one molecule. Thus, castor oil exhibits unique characteristics different from other plant fat and oil.

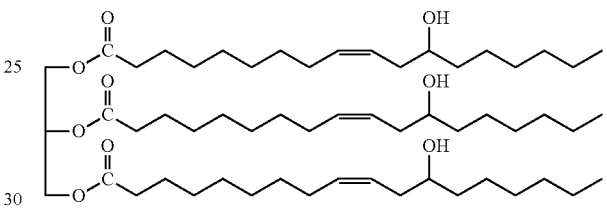

oleic acid and is

Ricinoleic acid is a compound having a structure represented by the following formula:

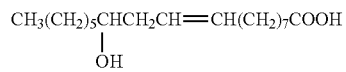

The castor oil polyol (b1) used in the present invention is a polyol derived from castor oil and has 1.5 to 2.3 functional groups on average and preferably 1.8 to 2.1 functional groups on average. When the average number of functional groups in the castor oil polyol (b1) is within this range, a two-part curable polyurethane foam resin composition that can exhibit excellent flexibility can be obtained.

The castor oil polyol (b1) content in the two-part curable polyurethane foam resin composition of the present invention is preferably in the range of 10 to 45% by mass and more preferably 25 to 45% by mass. When the castor oil polyol (b1) content in the two-part curable polyurethane foam resin composition is within this range, the impact on the global environment can be effectively reduced.

The hydroxyl value of the castor oil polyol (b1) is preferably in the range of 40 to 180 mgKOH/g and more preferably in the range of 45 to 180 mgKOH/g. When the hydroxyl value of the castor oil polyol (b1) is within this range, excellent physical properties (strength, elongation, flexibility, dimensional stability, wear resistance, etc.) can be obtained.

In the description below, the units of the hydroxyl value, mgKOH/g, are omitted.

In the main agent containing the urethane prepolymer (A), the polyol (b2) and/or PTMG (b3) can be used in combination with the castor oil polyol (b1), i.e., the essential component, as the polyol component to be reacted with the polyisocyanate (a1).

In the curing agent, the polyol (b2) and/or PTMG (b3) is used as the essential component in combination with the castor oil polyol (b1) which is an essential component of the isocyanate-reactive compound (B) described below.

As discussed above, in the present invention, the main agent and the curing agent both use, as an essential reaction component, the castor oil polyol (b1) which is a plant-derived raw material and has 1.5 to 2.3 functional groups on average.

The two-part curable polyurethane foam resin composition of the present invention contains the castor oil polyol (b1) and the polyol (b2) and/or PTMG (b3) at a mass ratio, (b1)/[(b2)+(b3)] of 15/85 to 60/40 where the castor oil polyol (b1) content is 10 to 40% by mass. Preferably, the mass ratio, (b1)/[(b2)+(b3)], is 30/70 to 50/50 and the castor oil polyol (b1) content is 25 to 40% by mass. When the castor oil polyol (b1) content and the content of the polyol (b2) and/or PTMG (b3) are within these ranges, the drawback, i.e., the decrease in strength due to use of castor-oil polyols, can be moderated, and excellent physical properties (flexibility and strength in particular) can be obtained.

The polyol (b2) prepared by addition polymerization of lactone to polytetramethylene glycol is prepared by addition-polymerizing lactone, such as ε-caprolactone, γ-butyrolactone, or valerolactone, to polyoxytetramethylene glycol synthesized by ring-opening polymerization of tetrahydrofuran (THF) preferably at a lactone addition ratio of 5 to 50% by mass and more preferably 10 to 40% by mass. When the lactone addition ratio in the polyol (b2) is within this range, the high crystallinity of the polyol after addition polymerization decreases adequately and excellent bending resistance can be obtained.

The "lactone addition ratio" in the present invention can be calculated as follows:

Lactone addition ratio(mass %)=[molecular weight of lactone to be added/total molecular weight of polyols subjected to addition polymerization]×100

The hydroxyl value of the polyol (b2) is preferably in the range of 37 to 115, more preferably in the range of 37 to 90, and most preferably in the range of 45 to 75. When the hydroxyl value of the polyol (b2) is within in this range, excellent physical properties (strength, elongation, flexibility, dimensional stability, wear resistance, etc.) can be obtained. When the hydroxyl value of the polyol (b2) is significantly smaller outside this range, physical properties such as the elongation and impact resilience may be degraded. When the hydroxyl value of the polyol (b2) is significantly larger outside this range, the viscosity and the melting point of the polyol will increase and thus the ease of molding operation and moldability may be adversely affected.

The hydroxyl value of the PTMG (b3) is preferably in the range of 37 to 115, more preferably in the range of 37 to 90, and most preferably in the range of 45 to 75. When the hydroxyl value of the PTMG (b3) is within this range, excellent physical properties (strength, elongation, flexibility, dimensional stability, wear resistance, etc.) can be obtained.

If needed, another polyol (b4) such as a polyester polyol, a polyether polyol, a polycarbonate polyol, or a low-molecular-weight glycol, may be used in combination as the polyol component that can be reacted with the polyisocyanate (a1).

The dicarboxylic acid that can be used in producing the polyester polyol may be any. Examples of the dicarboxylic acid that has an aromatic skeleton include dicarboxylic acids such as terephthalic acid, isophthalic acid, orthophthalic acid, naphthalene dicarboxylic acid, diphenyldicarboxylic acid, and 1,2-bis(phenoxy)ethane-p,p'-dicarboxylic acid. Examples of the dicarboxylic acid that does not have an aromatic skeleton include succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, p-hydroxybenzoic acid, p-(2-hydroxyethoxy)benzoic acid, trimellitic acid, and pyromellitic acid. These may be used alone or in combination of two or more.

The diol that can be used in producing the polyester polyol may be any. Examples of the diol having an aromatic skeleton include diols such as dihydroxynaphthalene, bisphenol A, bisphenol S, bisphenol AF, bisphenol $Si_2$, and alkylene oxide adducts of these. Examples of the diol that does not have an aromatic skeleton include aliphatic diols such as ethylene glycol (EG), 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, 3-methyl-1,5-pentanediol, 2-butyl-2-ethyl-1,3-propanediol, and 2-methyl-1,3-propanediol; and alicyclic diols such as 1,4-cyclohexanediol, 1,4-cyclohexanedimethanol, and hydrogenated bisphenol A. These may be used alone or in combination of two or more.

Examples of the other raw materials for the polyester polyol that can be used as needed include alcohols such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, and aconitic sugar; and amines. These may be used alone or in combination of two or more.

The hydroxyl value of the polyester polyol is preferably set by considering the target viscosity of the urethane prepolymer (A) which is the main agent. The hydroxyl value of the polyester polyol is preferably in the range of 45 to 225 and more preferably in the range of 75 to 150. When the hydroxyl value of the polyester polyol is within this range, an excessive increase in viscosity of the urethane prepolymer (A), i.e., the main agent, can be suppressed and a urethane prepolymer having a target viscosity can be obtained.

The polyester polyol may be a polyester diol or a polyamide polyester diol obtained from a carboxylic acid, a diol, a diamine, etc., other than those described above.

Examples of the polyether polyol include polyethylene glycol (PEG), polypropylene glycol (PPG), polyethylene propylene glycol (PEPG), polytetramethylene glycol (PTMG), 2-methyl-1,3-propane adipate, 3-methyl-1,5-pentane adipate, and polycarbonate polyol. Among these, polytetramethylene glycol (PTMG, hydroxyl value of 45 to 75) is preferred. The polyether polyol may be linear, branched, or cyclic.

The hydroxyl value of the polyether polyol is preferably in the range of 37 to 225 and more preferably in the range of 55 to 115. When the hydroxyl value of the polyether polyol is within this range, the brittleness can be controlled while achieving high strength and excellent wear resistance can be obtained.

Reaction products of the esterification between carbonates and aliphatic polyols can be used as the polycarbonate polyol. Examples thereof include reaction products between a diol, such as 1,3-propanediol, 1,4-butanediol, 1,6-hexanediol, diethylene glycol, polyethylene glycol, polypropylene glycol, or polytetramethylene glycol (PTMG), and dimethyl carbonate, diphenyl carbonate, phosgene, or the like. These may be used alone or in combination.

Examples of the low-molecular-weight glycol include aliphatic diols such as ethylene glycol (EG), 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, 3-methyl-1,5-pentanediol, 2-butyl-2-ethyl-1,3-propanediol, and 2-methyl-1,3-propanediol; alicyclic diols such as 1,4-cyclohexanediol, 1,4-cyclohexanedimethanol, and hydrogenated bisphenol A; and trifunctional or higher functional hydroxyl-containing compounds such as glycerin, trimethylolpropane, and pentaerythritol. Among these, diethylene glycol (DEG) is preferable. The low-molecular-weight glycol may be linear, branched, or cyclic.

The molecular weight of the low-molecular-weight glycol is preferably within the range of 50 to 300 and more preferably in the range of 50 to 200. When the molecular weight of the low-molecular-weight glycol is within this range, the reactivity can be effectively controlled when used as an additional polyol component and the moldability (yield and molding uniformity) can be improved.

In the present invention, the main agent, namely, the urethane prepolymer (A), uses, as an essential component, a castor oil polyol (b1) which is a plant-derived raw material having an average of 1.5 to 2.3 functional groups and serves as a polyol component to be reacted with the polyisocyanate (a1) to conduct reaction. The reaction may be conducted by using the polyol (b2) prepared by addition polymerization of lactone to the polytetramethylene glycol, the polytetramethylene glycol (b3), or another polyol (b4) in combination. As a result, during foaming and curing of the two-part curable polyurethane foam resin composition to conduct molding, the reactivity can be more easily controlled, the workability can be further improved, foam cells of uniform and fine shapes can be easily formed, and excellent cell controllability and moldability (yield and molding uniformity) and high strength can be simultaneously achieved.

In synthesizing the urethane prepolymer (A), the ratio of the isocyanate group equivalent of the polyisocyanate (a1) to the total of the hydroxyl group equivalents in (b1) to (b4) (i.e., NCO/OH equivalent ratio) may be any as long as the ratio is set by considering the desired physical properties.

Next, the curing agent that is used in combination with, blended with, and mixed with the main agent is described.

The curing agent used in the two-part curable polyurethane foam resin composition of the present invention contains, as essential components, an isocyanate-reactive compound (B) (hereinafter referred to as "reactive compound (B)"), water (C) serving as a blowing agent, and a catalyst (D).

The reactive compound (B) uses, as essential components, the castor oil polyol (b1) and the polyol (b2) prepared by addition polymerization of lactone to polytetramethylene glycol and/or the polytetramethylene glycol (b3). When the polyol (b2) and/or the PTMG (b3) is used in combination with the castor oil polyol (b1) having an average number of functional groups within a particular range, the decrease in strength due to use of the castor oil polyol (b1) can be moderated and excellent physical properties (in particular, flexibility and strength) can be obtained.

Other reactive compounds can be used as optional components together with the reactive compound (B) as long as the reaction and performance are not adversely affected. Such reactive compounds may be any compounds that have sufficient reactivity to the isocyanate-containing compound. Examples thereof include a polyaminochlorophenylmethane compound, a mixture of polyaminochlorophenylmethane compound and polytetramethylene glycol, and 4,4'-diamino-3,3'-dichlorophenylmethane (hereinafter referred to as "MBOCA") which is a dinuclear compound of a polyaminochlorophenylmethane compound. These may be used alone or in combination.

The reactive compound (B) content is preferably in the range of 60 to 170 parts by mass and more preferably in the range of 75 to 135 parts by mass relative to 100 parts by mass of the urethane prepolymer (A). When the reactive compound (B) content is within this range, stirring and mixing can be efficiently conducted in a low-pressure foaming machine, foam cells of uniform and fine shapes can be formed, and a two-part curable polyurethane foam resin composition that can exhibit excellent performance such as high hardness and wear resistance and that is suitable for producing articles such as shoe soles can be obtained.

Water (C) is added to serve as a blowing agent in a water foaming method. The water content is preferably in the range of 0.01 to 1 part by mass and more preferably in range of 0.3 to 0.7 relative to 100 parts by mass of the reactive compound (B). When the water (C) content is within this range, a two-part curable polyurethane foam resin composition that can be stably foamed can be obtained.

The method for adding water (C) in mixing the main agent and the curing agent is not particularly limited. For example, the reactive compound (B), the water (C), the catalyst (D), and, if needed, an additive may be mixed with each other in advance to form a curing agent, and then the main agent and the curing agent are mixed with each other to conduct foaming and curing.

The catalyst (D) is added to the two-part curable polyurethane foam resin composition of the present invention.

The type and the amount of the catalyst (D) added may be any as long as the time taken from mixing of the catalyst to pouring of the mixture into a mold, the temperature, and the final foaming state of the foam are taken into account.

The catalyst (D) may be any. Examples thereof include tertiary amine catalysts such as triethylene diamine, N,N-dimethylaminoethyl ether, dimethylethanolamine, triethanolamine, N,N,N',N'-tetramethylhexamethylenediamine, and N-methylimidazole, and metal catalysts such as dioctyltin dilaurate. Among these, triethylenediamine, N,N-dimethylaminoethyl ether are preferred since they have relatively strong foaming characteristics. These may be used alone or in combination.

The amount of the catalyst (D) added is preferably in the range of 0.15 to 1.5 parts by mass and more preferably 0.3 to 1.0 part by mass relative to 100 parts by mass of the reactive compound (B). When the catalyst (D) content is within this range, a two-part curable polyurethane foam resin composition that can exhibit a stable foam state can be obtained.

The curing agent may be adjusted by adding and mixing the water (C) and the catalyst (D) as essential components and preferably within ranges of the contents described above together with the reactive compound (B).

When the main agent and the curing agent adjusted as described above are blended as prescribed and the resulting mixture is immediately thoroughly mixed, a two-part curable polyurethane foam resin composition of the present invention can be obtained.

The ratio of the main agent to the curing agent for obtaining the two-part curable polyurethane foam resin composition of the present invention, i.e., [total number of moles ($\alpha$) of isocyanate groups in the urethane prepolymer (A) which is the main agent]/[total number of moles ($\beta$) of isocyanate-reactive groups in the curing agent including the reactive compound (B) and water (C)], is preferably $\alpha/\beta=1/0.8$ to $1/1.1$ and more preferably $1/0.9$ to $1/1$. When the blend ratio of the main agent to the curing agent is within this range, a two-part curable polyurethane foam resin composition that can exhibit high strength and excellent wear resistance can be obtained.

Known additives can be used in any stage of producing the two-part curable polyurethane foam resin composition as long as the object of the present invention is not impaired. Examples of the additives include a foam stabilizer, an antioxidant, a defoaming agent, a UV absorber, an abrasive, a filler, a pigment, a thickener, a surfactant, a flame retarder, a plasticizer, a lubricant, an antistatic agent, a heat stabilizer, and a blend resin. The additives described in the present invention are merely illustrative examples and the types thereof are not particularly limited.

The foam stabilizer may be any foam stabilizer that can stably form fine cells. Examples thereof include silicon surfactants such as Silicon Y-7006 (trademark, produced by Nippon Unicar Company Limited), and Toray silicone SH-193, Toray silicone SH-192, and Toray silicone SH-190 (produced by Dow Corning Toray Silicone).

Examples of the filler include a carbonate, silicic acid, a silicate, a hydroxide, a sulfate, a borate, a titanate, a metal oxide, a carbonaceous material, and an organic material.

The two-part curable polyurethane foam resin composition of the present invention uses little or no petroleum-derived raw materials conventionally used and a plant-derived raw material, the castor oil polyol (b1), is used in both the isocyanate-terminated urethane prepolymer (A) which is a main agent and the isocyanate-reactive compound (B) which is a curing agent. Thus the biomass ratio is improved, the impact on the environment can be reduced, and excellent physical properties (strength, elongation, flexibility, dimensional stability, wear resistance, etc.) are exhibited when used in combination with polytetramethylene glycol. Accordingly, the composition can be applied to various types of molded articles, e.g., shoe soles of various types of footwear such as jogging shoes, sport shoes, chemical shoes, sandals, men's leather shoes, women's leather shoes, student shoes, medical shoes, and safety shoes, industrial components such as packings, hoses, sheets, and cushioning materials, decoration cushioning components such as furniture and mattresses, packaging components such as wrapping materials, and vehicle components such as vehicle bumpers and shock absorbers.

Next, a shoe sole of the present invention is described.

The two-part curable polyurethane foam resin composition according to the present invention can be molded by a usual method into a shoe sole according to the present invention. The shoe sole of the present invention has a density in the range of 0.3 to 1.0 g/cm$^3$ and preferably in the range of 0.4 to 0.7 g/cm$^3$. When the density of the shoe sole is within this range, excellent strength and wear resistance can be obtained.

The shoe sole of the present invention is made from the two-part curable polyurethane foam resin composition described above. For example, a shoe sole can be obtained by adding and mixing, as needed, additives such as those described above with the two-part curable polyurethane foam resin composition for forming shoe soles, pouring the resulting mixture into a pre-heated mold having a particular shape so as to foam the mixture, curing the foamed mixture, releasing the molded foam from the mold, and processing the molded foam into a desired shape.

Various methods other than the water foaming method described above are available as the method for producing the shoe sole, including a method of adding hollow beads, a mechanical foaming method, and a chemical foaming method. While any method can be employed, a water foaming method is preferable from the viewpoint of production efficiency and production cost.

An example of a method for producing a shoe sole by using a two-part curable polyurethane foam resin composition according to the present invention is described below. The method is a water foaming method that includes a series of steps, [step 1] to [step 4]. The conditions of the each step are not particularly limited.

It should be noted here that any method can be selected in any step as long as the additive described above can be added smoothly and uniform blending and mixing are possible.

[Step 1] Main Agent Preparation Step

Into a reactor equipped with a nitrogen introduction tube, a cooling condenser, a thermometer, and a cooler, for example, a polyisocyanate (a1), i.e., diphenylmethane diisocyanate (MDI for short; 4,4'-isomer, 2,4'-isomer, 2,2'-isomer, or a mixture of these), and carbodiimide-modified diphenylmethane diisocyanate, and a polyol component, i.e., a castor oil polyol (b1), were charged. The mixture was reacted under stirring in a nitrogen atmosphere at a temperature preferably in the range of 60 to 90° C. and more preferably in the range of 60 to 70° C. to synthesize a urethane prepolymer (A). As a result, a main agent containing the urethane prepolymer (A) is obtained.

The isocyanate group equivalent of the urethane prepolymer (A) is preferably in the range of 200 to 300. The average number of functional groups in the castor oil polyol (b1) used in synthesis of the urethane prepolymer (A) is in the range of 1.5 to 2.3 and the hydroxyl value is preferably in the range of 45 to 180.

[Step 2] Step of Mixing Main Agent and Curing Agent

Then the main agent containing the urethane prepolymer (A) and the curing agent containing, as essential components, a reactive compound (B), water (C), and a catalyst (D) are mixed and stirred to prepare a foam reaction liquid. For example, the foam reaction liquid may be prepared by charging the main agent containing the urethane prepolymer (A) and the curing agent containing the reactive compound (B) containing the water (C) and the catalyst (D) as the essential components into tanks of a two-part mixing low-pressure foaming machine, heating the main agent containing the urethane prepolymer (A) to preferably 40 to 50° C., heating the curing agent to preferably 40 to 50° C., and mixing and stirring the main agent and the curing agent in the two-part mixing low-pressure foaming machine.

[Step 3] Mold Pouring Step

The foam reaction liquid is poured into a mold preferably preheated to 40 to 50° C.

[Step 4] Curing Step

The foam reaction liquid poured into the mold is heated and retained in an adequate temperature range (e.g., a range of 40 to 50° C.) to be foamed and cured, and left in the mold at preferably 40 to 50° C. for 3 to 15 minutes. Then the molded article is released from the die. If needed, an adequate processing such as cutting is conducted to form the article into a shoe sole shape. The processing method is not particularly limited.

EXAMPLES

The present invention will now be described more specifically by using examples which do not limit the scope of the present invention.

It should be noted that, in the present invention, "parts" means "parts by mass" and "%" means "% by mass" unless otherwise noted.

The measurement methods and evaluation methods employed in the present invention are as follows.

[Method for Measuring Density of Polyurethane Foam]

The density (g/cm³) was calculated by dividing the mass of a polyurethane foam by the volume of the foam.

[Method for Measuring Hardness of Polyurethane Foam]

A spring-type hardness test (type C) was performed according to Japanese Industrial Standards JIS K 7312-1996 (hardness test) to evaluate hardness.

[Method for Measuring Tensile Strength of Polyurethane Foam]

The tensile strength was measured according to Japanese Industrial Standards JIS K 7312-1996 (tensile test) by using a No. 2 dumbbell specimen at a test speed of 500 mm/min, a gauge length of 20 mm, and a measurement temperature of 23° C.

The tensile strength of the polyurethane foam was evaluated according to the following criteria.

A: Tensile strength was 2.0 MPa or more
F: Tensile strength was less than 2.0 MPa

[Method for Measuring Elongation of Polyurethane Foam]

The elongation was measured according to Japanese Industrial Standards JIS K 7312-1996 (tensile test) by using a No. 3 dumbbell specimen at a test speed of 500 mm/min, a gauge length of 20 mm, and a measurement temperature of 23° C.

The elongation of the polyurethane foam was evaluated according to the following criteria.

A: Elongation exceeded 350%
F: Elongation was less than 350%

[Method for Measuring Tear Strength of Polyurethane Foam]

The tear strength was measured according to Japanese Industrial Standards JIS K 7312-1996 (tear test) by using a nicked angle specimen at a test speed of 500 mm/min and a measurement temperature of 23° C.

The tear strength of the polyurethane foam was evaluated according to the following criteria.

A: Tear strength exceeded 10 N/mm
F: Tear strength was less than 10 N/mm

[Method for Measuring Flexibility of Polyurethane Foam]

A crack width of 2 mm was formed in the central portion of a specimen 150 mm (length)×25 mm (width)×10 mm (thickness) in size prepared by a low-pressure foaming machine and a reverse bend test was performed for 100,000 cycles at 90° C.

The flexibility of the polyurethane foam was evaluated according to the following criteria.

A: The growth of the crack width was less than 10 mm
F: The growth of the crack width was 10 mm or more

[Method for Measuring Dimensional Stability of Polyurethane Foam]

The dimensional stability was evaluated by using a specimen 290 mm (length)×120 mm (width)×10 mm (thickness) in size prepared in a low-pressure foaming machine. The evaluation was done according to the following criteria by calculating the decrease (%) in dimension 1 week after molding by using the following equation:

$$\text{Decrease in dimension}(\%) = (L_0 - L_7)/L_0 \times 100$$

where $L_0$ is the initial value of the dimension immediately after molding in the longitudinal direction of the specimen 290 mm in length and $L_7$ is the dimension 1 week after the molding.

The dimensional stability of the polyurethane foam was evaluated according to the following criteria:

A: Decrease in dimension was less than 3%
F: Decrease in dimension was 3% or more Example 1

Preparation of Two-Part Curable Polyurethane Foam Resin Composition (P-1)

Into a 1 L four-necked round-bottomed flask equipped with a nitrogen introduction tube, a cooling condenser, a thermometer, and a stirrer, a polyisocyanate (a1), i.e., 950 parts of 4,4'-diphenylmethane diisocyanate (hereinafter referred to as "4,4'-MDI", trademark: Millionate MT, product of Nippon Polyurethane Industry Co., Ltd.) and 50 parts of a carbodiimide-modified MDI (trademark: COSMONATE LL, produced by Mitsui Chemicals Polyurethane, Inc.) and stirring was initiated. Thereto, 974 parts of a polyol component, i.e., a castor oil polyol (b1) (trademark: URIC HF-2009 produced by ITOH OIL CHEMICALS CO., LTD., hydroxyl value: 47) was charged in divided portions, followed by mixing, to conduct reaction for 8 hours in a nitrogen stream at 60° C. As a result, 278 NCO equivalent of an isocyanate-terminated urethane prepolymer (A-1) (hereinafter referred to as "urethane prepolymer (A-1)") was obtained.

Next, an isocyanate-reactive compound (B-1), i.e., 150 parts of a castor oil polyol (b1) (trademark: URIC HF-2009 produced by ITOH OIL CHEMICALS CO., LTD., hydroxyl value: 47), 850 parts of a polyol (b2) prepared by addition polymerization of lactone to polytetramethylene glycol (lactone addition ratio: 20%, hydroxyl value: 45), and 60 parts of 1,3-propanediol (produced by Dow Chemical Japan), water serving as a blowing agent, i.e., 6 parts of ion exchange water, a foam stabilizer, i.e., 5 parts of Silicon Y-7006 (trademark: produced by Nippon Unicar Company Limited), and a catalyst (D), i.e., 8.3 parts of triethylenediamine, were blended, thoroughly stirred, and mixed. As a result, a polyol compound which serves as a curing agent was obtained.

Next, the main agent, i.e., the urethane prepolymer (A-1), and the curing agent, i.e., the polyol compound, were stirred and mixed in a container at a main agent [urethane prepolymer (A-1)]/curing agent [polyol compound] ratio of 100/120.5 on a bass basis to prepare a two-part curable polyurethane foam resin composition (P-1) for shoe soles. Then 200 g of the composition (P-1) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-1) for shoe soles according to the present invention had excellent physical properties (tensile strength, elongation, tear strength, flexibility and dimensional stability) as shown in Table 1.

Example 2

Preparation of Two-Part Curable Polyurethane Foam Resin Composition (P-2)

A urethane prepolymer (A-1) having an NCO equivalent of 278 was obtained as in Example 1.

An isocyanate-reactive compound (B-2), i.e., 150 parts of a castor oil polyol (b1) (trademark: URIC HF-2009 produced by ITOH OIL CHEMICALS CO., LTD., hydroxyl value: 47), 850 parts of polytetramethylene glycol (b3) (trademark: PTMG-2000, produced by Mitsubishi Chemical Corporation, hydroxyl value: 56), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thorough stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/115 on a mass basis to prepare a two-part curable polyurethane foam resin composition (P-2) for shoe soles. Then 200 g of the composition (P-2) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-2) for shoe soles according to the present invention had excellent physical properties (tensile strength, elongation, tear strength, flexibility and dimensional stability) as shown in Table 1.

Example 3

Preparation of Two-Part Curable Polyurethane Foam Resin Composition (P-3)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, 968 parts of a polyol component, i.e., a castor oil polyol (b1) (trademark: URIC HF-5001 produced by ITOH OIL CHEMICALS CO., LTD., hydroxyl value: 45) was charged in divided portions, followed by mixing, to conduct reaction for 8 hours in a nitrogen stream at 60° C. As a result, 278 NCO equivalent of an isocyanate-terminated urethane prepolymer (A-2) (hereinafter referred to as "urethane prepolymer (A-2)") was obtained.

An isocyanate-reactive compound (B-3), i.e., 150 parts of a castor oil polyol (b1) (trademark: URIC PH-5001 produced by ITOH OIL CHEMICALS CO., LTD., hydroxyl value: 45), 850 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-2), and the curing agent, i.e., the polyol compound, were stirred and mixed at a main agent [urethane prepolymer (A-2)]/curing agent [polyol compound] ratio of 100/115 on a mass basis to prepare a two-part curable polyurethane foam resin composition (P-3). Then 200 g of the composition (P-3) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-3) for shoe soles according to the present invention had excellent physical properties (tensile strength, elongation, tear strength, flexibility, and dimensional stability) as shown in Table 1.

Example 4

Preparation of Two-Part Curable Polyurethane Foam Resin Composition (P-4)

A urethane prepolymer (A-1) having an NCO equivalent of 278 was obtained as in Example 1.

An isocyanate-reactive compound (B-4), i.e., 400 parts of a castor oil polyol (b1) (trademark: URIC HF-2009 produced by ITOH OIL CHEMICALS CO., LTD., hydroxyl value: 47), 600 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/120.5 on a mass basis to prepare a two-part curable polyurethane foam resin composition (P-4). Then 200 g of the composition (P-4) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-4) for shoe soles according to the present invention had excellent physical properties (tensile strength, elongation, tear strength, flexibility, and dimensional stability) as shown in Table 1.

Example 5

Preparation of Two-Part Curable Polyurethane Foam Resin Composition (P-5)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, a polyol component, i.e., 241.3 parts of a castor oil polyol (b1) (trademark: URIC HF-2009 produced by ITOH OIL CHEMICALS CO., LTD., hydroxyl value: 47) and 723.8 parts of polytetramethylene glycol (b3) (trademark: PTMG-2000, produced by Mitsubishi Chemical Corporation, hydroxyl value: 56), was charged in divided portions, followed by mixing, to conduct reaction for 8 hours in a nitrogen stream at 60° C. As a result, 278 NCO equivalent of an isocyanate-terminated urethane prepolymer (A-3) (hereinafter referred to as "urethane prepolymer (A-3)") was obtained.

An isocyanate-reactive compound (B-5), i.e., 150 parts of a castor oil polyol (b1) (trademark: URIC HF-2009 produced by ITOH OIL CHEMICALS CO., LTD., hydroxyl value: 47), 850 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-3), and the curing agent, i.e., the polyol compound, were stirred and mixed at a main agent [urethane prepolymer (A-3)]/curing agent [polyol compound] ratio of 100/120.5 on a mass basis to prepare a two-part curable polyurethane foam resin composition (P-5). Then 200 g of the composition (P-5) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-5) for shoe soles according to the present invention had excellent physical properties (tensile strength, elongation, tear strength, flexibility and dimensional stability) as shown in Table 1.

Example 6

Preparation of Two-Part Curable Polyurethane Foam Resin Composition (P-6)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, a polyol component, i.e., 818.4 parts of a castor oil polyol (b1) (trademark: URIC HF-2009 produced by ITOH OIL CHEMICALS CO., LTD., hydroxyl value: 47) and 111.6 parts of a castor oil polyol (b1) (trademark: URIC H-31, produced by ITOH OIL CHEMICALS CO., LTD., hydroxyl value: 164), was charged in divided portions, followed by mixing, to conduct reaction for 8 hours in a nitrogen stream at 60° C. As a result, 278 NCO equivalent of an isocyanate-terminated urethane prepolymer (A-4) (hereinafter referred to as "urethane prepolymer (A-4)") was obtained.

An isocyanate-reactive compound (B-6), i.e., 88 parts of a castor oil polyol (b1) (trademark: URIC HF-2009 produced by ITOH OIL CHEMICALS CO., LTD., hydroxyl value: 47), 12 parts of a castor oil polyol (b1) (trademark: URIC H-31 produced by ITOH OIL CHEMICALS CO., LTD., hydroxyl value: 164), 900 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-4), and the curing agent, i.e., the polyol compound, were stirred and mixed at a main agent [urethane prepolymer (A-4)]/curing agent [polyol compound] ratio of 100/119 on a mass basis to prepare a two-part curable polyurethane foam resin composition (P-6). Then 200 g of the composition (P-6) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-6) for shoe soles according to the present invention had excellent physical properties (tensile strength, elongation, tear strength, flexibility and dimensional stability) as shown in Table 1.

Example 7

Preparation of Two-Part Curable Polyurethane Foam Resin Composition (P-7)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, a polyol component, i.e., 725.4 parts of a castor oil polyol (b1) (trademark: URIC HF-2009 produced by ITOH OIL CHEMICALS CO., LTD., hydroxyl value: 47) and 204.6 parts of a castor oil polyol (b1) (trademark: URIC H-57, produced by ITOH OIL CHEMICALS CO., LTD., hydroxyl value: 100), was charged in divided portions, followed by mixing, to conduct reaction for 8 hours in a nitrogen stream at 60° C. As a result, 278 NCO equivalent of an isocyanate-terminated urethane prepolymer (A-5) (hereinafter referred to as "urethane prepolymer (A-5)") was obtained.

An isocyanate-reactive compound (B-7), i.e., 78 parts of a castor oil polyol (b1) (trademark: URIC HF-2009 produced by ITOH OIL CHEMICALS CO., LTD., hydroxyl value: 47), 22 parts of a castor oil polyol (b1) (trademark: URIC H-57 produced by ITOH OIL CHEMICALS CO., LTD., hydroxyl value: 100), 900 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-5), and the curing agent, i.e., the polyol compound, were stirred and mixed at a main agent [urethane prepolymer (A-5)]/curing agent [polyol compound] ratio of 100/119 on a mass basis to prepare a two-part curable polyurethane foam resin composition (P-7). Then 200 g of the composition (P-7) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-7) for shoe soles according to the present invention had excellent physical properties (tensile strength, elongation, tear strength, flexibility and dimensional stability) as shown in Table 1.

Example 8

Preparation of Two-Part Curable Polyurethane Foam Resin Composition (P-8)

A urethane prepolymer (A-1) having an NCO equivalent of 278 was obtained as in Example 1.

An isocyanate-reactive compound (B-8), i.e., 150 parts of a castor oil polyol (b1) (trademark: URIC HF-2009 produced by ITOH OIL CHEMICALS CO., LTD., hydroxyl value: 47), 850 parts of a polyol (b2) prepared by addition polymerization of lactone to polytetramethylene glycol (lactone addition ratio: 20%, hydroxyl value: 45), and 50 parts of ethylene glycol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/117.6 on a mass basis to prepare a two-part curable polyurethane foam resin composition (P-8). Then 210 g of the composition (P-8) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-8) for shoe soles according to the present invention had excellent physical properties (tensile strength, elongation, tear strength, flexibility and dimensional stability) as shown in Table 1.

Example 9

Preparation of Two-Part Curable Polyurethane Foam Resin Composition (P-9)

A urethane prepolymer (A-1) having an NCO equivalent of 278 was obtained as in Example 1.

An isocyanate-reactive compound (B-9), i.e., 150 parts of a castor oil polyol (b1) (trademark: URIC HF-2009 produced by ITOH OIL CHEMICALS CO., LTD., hydroxyl value: 47), 850 parts of a polyol (b2) prepared by addition polymerization of lactone to polytetramethylene glycol (lactone addition ratio: 20%, hydroxyl value: 45), and 50 parts of 1,4-butanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/137 on a mass basis to prepare a two-part curable polyurethane foam resin composition (P-9). Then 210 g of the composition (P-9) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-9) for shoe soles according to the present invention had excellent physical properties (tensile strength, elongation, tear strength, flexibility and dimensional stability) as shown in Table 1.

Comparative Example 1

Preparation of Two-Part Curable Polyurethane Foam Resin Composition (P-10)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, a polyol component, i.e., 755.3 parts of a castor oil polyol (b1) (trademark: URIC HF-2009 produced by ITOH OIL CHEMICALS CO., LTD., hydroxyl value: 47) and 154.7 parts a castor oil polyol (b1) (trademark: URIC H-31 produced by ITOH OIL CHEMICALS CO., LTD., hydroxyl value: 164), was charged in divided portions, followed by mixing, to conduct reaction for 8 hours in a nitrogen stream at 60° C. As a result, 278 NCO equivalent of an isocyanate-terminated urethane prepolymer (A-6) (hereinafter referred to as "urethane prepolymer (A-6)") was obtained.

An isocyanate-reactive compound (B-10), i.e., 83 parts of a castor oil polyol (b1) (trademark: URIC HF-2009 produced by ITOH OIL CHEMICALS CO., LTD., hydroxyl value: 47), 17 parts of a castor oil polyol (b1) (trademark: URIC H-31 produced by ITOH OIL CHEMICALS CO., LTD., hydroxyl value: 164), 900 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-6), and the curing agent, i.e., the polyol compound, were stirred and mixed at a main agent [urethane prepolymer (A-6)]/curing agent [polyol compound] ratio of 100/117.6 on a mass basis to prepare a two-part curable polyurethane foam resin composition (P-10). Then 200 g of the composition (P-10) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-10) had low tensile strength as shown in Table 2.

Comparative Example 2

Preparation of Two-Part Curable Polyurethane Foam Resin Composition (P-11)

Into a 1 L four-necked round-bottomed flask equipped with a nitrogen introduction tube, a cooling condenser, a thermometer, and a stirrer, a polyisocyanate (a1), i.e., 950 parts of 4,4'-MDI and 50 parts of a carbodiimide-modified MDI, was charged and stirring was initiated. Thereto, a polyol component, i.e., 664 parts of a castor oil polyol (b1) (trademark: URIC HF-2009 produced by ITOH OIL CHEMICALS CO., LTD., hydroxyl value: 47) and 276 parts of a castor oil polyol (b1) (trademark: URIC H-57, produced by ITOH OIL CHEMICALS CO., LTD., hydroxyl value: 100), was charged in divided portions, followed by mixing, to conduct reaction for 8 hours in a nitrogen stream at 60° C. As a result, 278 NCO equivalent of an isocyanate-terminated urethane prepolymer (A-7) (hereinafter referred to as "urethane prepolymer (A-7)") was obtained.

An isocyanate-reactive compound (B-11), i.e., 70 parts of a castor oil polyol (b1) (trademark: URIC HF-2009 produced by ITOH OIL CHEMICALS CO., LTD., hydroxyl value: 47), 30 parts of a castor oil polyol (b1) (trademark: URIC H-31 produced by ITOH OIL CHEMICALS CO., LTD., hydroxyl value: 164), 900 parts of a polyol (b2) prepared by addition polymerization of lactone to polytetramethylene glycol (lactone addition ratio: 20%, hydroxyl value: 45), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-7), and the curing agent, i.e., the polyol compound, were stirred and mixed at a main agent [urethane prepolymer (A-7)]/curing agent [polyol compound] ratio of 100/117.6 on a mass basis to prepare a two-part curable polyurethane foam resin composition (P-11). Then 200 g of the composition (P-11) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-11) had low tensile strength, elongation, and flexibility as shown in Table 2.

Comparative Example 3

Preparation of Two-Part Curable Polyurethane Foam Resin Composition (P-12)

The same operation as in Example 1 was conducted to obtain 278 NCO equivalent of a urethane prepolymer (A-1).

An isocyanate-reactive compound (B-12), i.e., 500 parts of a castor oil polyol (b1) (trademark: URIC HF-2009 produced by ITOH OIL CHEMICALS CO., LTD., hydroxyl value: 47), 500 parts of polytetramethylene glycol (b3) (trademark: PTMG-2000, produced by Mitsubishi Chemical Corporation, hydroxyl value: 56), and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/116.3 on a mass basis to prepare a two-part curable polyurethane foam resin composition (P-12). Then 210 g of the composition (P-12) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-12) had low elongation and flexibility as shown in Table 2.

Comparative Example 4

Preparation of Two-Part Curable Polyurethane Foam Resin Composition (P-13)

The same operation as in Example 1 was conducted to obtain 278 NCO equivalent of a urethane prepolymer (A-1).

An isocyanate-reactive compound (B-13), i.e., 1000 parts of polyalkylene glycol (trademark: ACTCOL EP-550N produced by Mitsui Chemicals Inc., hydroxyl value: 56) and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/123.5 on a mass basis to prepare a two-part curable polyurethane foam resin composition (P-13). Then 200 g of the composition (P-13) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-13) had low elongation, flexibility, and dimensional stability as shown in Table 2.

Comparative Example 5

Preparation of Two-Part Curable Polyurethane Foam Resin Composition (P-14)

The same operation as in Example 1 was conducted to obtain 278 NCO equivalent of a urethane prepolymer (A-1).

An isocyanate-reactive compound (B-14), i.e., 1000 parts of polyalkylene glycol (trademark: Adeca Polyether CM-294, produced by ADEKA CORPORATION, hydroxyl value: 37) and 60 parts of 1,3-propanediol, water (C) serving as a blowing agent, i.e., 6 parts of ion exchange water, a foam stabilizer, i.e., 5 parts of Silicon Y-7006 (trademark, produced by Nippon Unicar Company Limited), and a catalyst (D), i.e., 8.3 parts of triethylene diamine, were blended, thoroughly stirred, and mixed. As a result, a polyol compound serving as a curing agent was obtained.

In a container, the main agent, i.e., the urethane prepolymer (A-1), and the curing agent, i.e., the polyol compound, were stirred and mixed at a main agent [urethane prepolymer (A-1)]/curing agent [polyol compound] ratio of 100/114.9 on a mass basis to prepare a two-part curable polyurethane foam resin composition (P-14). Then 210 g of the composition (P-14) was poured into a mold (290 mm×120 mm×10 mm) preheated to 40° C., the lid of the mold was immediately closed, and the mold was left at 40° C. for 5 minutes. Then the resulting molded foam article was discharged.

The molded foam article made from the two-part curable polyurethane foam resin composition (P-14) had low elongation, flexibility, and dimensional stability as shown in Table 2.

TABLE 1-1

|  | Example 1 | Example 2 | Example 3 | Example 4 |
|---|---|---|---|---|
| Two-part curable polyurethane foam resin composition | P-1 | P-2 | P-3 | P-4 |
| Isocyanate-terminated urethane prepolymer (A) | A-1 | A-1 | A-2 | A-1 |
| Isocyanate-reactive compound (B) | B-1 | B-2 | B-3 | B-4 |

TABLE 1-1-continued

|  | Example 1 | Example 2 | Example 3 | Example 4 |
|---|---|---|---|---|
| Castor oil polyol (b1)/Polyol (b2) + PTMG (b3) mass ratio | 41/59 | 42/58 | 42/58 | 59/41 |
| Average number of functional groups in castor oil polyol (b1) | 2.0 | 2.0 | 2.0 | 2.0 |
| Castor oil polyol (b1) content in polyurethane resin composition (mass %) | 29.8 | 30.2 | 29.9 | 42.3 |
| Density (g/cm$^3$) | 0.53 | 0.54 | 0.54 | 0.55 |
| Hardness (Asker C) | 65 | 65 | 67 | 64 |
| Tensile strength (MPa) | 2.9 | 3.0 | 2.9 | 2.5 |
| Tensile strength evaluation result | A | A | A | A |
| Elongation (%) | 400 | 410 | 400 | 360 |
| Elongation evaluation result | A | A | A | A |
| Tear strength (N/mm) | 12.5 | 12.0 | 11.5 | 10.6 |
| Tear strength evaluation result | A | A | A | A |
| Flexibility (growth of crack width · mm) | 2 | 2 | 2 | 8 |
| Flexibility evaluation result | A | A | A | A |
| Dimensional stability | A | A | A | A |

TABLE 1-2

|  | Example 5 | Example 6 | Example 7 | Example 8 |
|---|---|---|---|---|
| Two-part curable polyurethane foam resin composition | P-5 | P-6 | P-7 | P-8 |
| Isocyanate-terminated urethane prepolymer (A) | A-3 | A-4 | A-5 | A-1 |
| Isocyanate-reactive compound (B) | B-5 | B-6 | B-7 | B-8 |
| Castor oil polyol (b1)/Polyol (b2) + PTMG (b3) mass ratio | 17/83 | 38/62 | 39/61 | 42/58 |
| Average number of functional groups in castor oil polyol (b1) | 2.0 | 1.5 | 2.3 | 2.0 |

TABLE 1-2-continued

|  | Example 5 | Example 6 | Example 7 | Example 8 |
|---|---|---|---|---|
| Castor oil polyol (b1) content in polyurethane resin composition (mass %) | 12.2 | 27.0 | 28.6 | 30.1 |
| Density (g/cm$^3$) | 0.54 | 0.54 | 0.54 | 0.55 |
| Hardness (Asker C) | 68 | 65 | 66 | 70 |
| Tensile strength (MPa) | 3.1 | 2.1 | 2.2 | 3.5 |
| Tensile strength evaluation result | A | A | A | A |
| Elongation (%) | 420 | 460 | 350 | 380 |
| Elongation evaluation result | A | A | A | A |
| Tear strength (N/mm) | 14.0 | 11.1 | 12.0 | 15.6 |
| Tear strength evaluation result | A | A | A | A |
| Flexibility (growth of crack width · mm) | 2 | 2 | 9 | 5 |
| Flexibility evaluation result | A | A | A | A |
| Dimensional stability | A | A | A | A |

TABLE 1-3

|  | Example 9 |
|---|---|
| Two-part curable polyurethane foam resin composition | P-9 |
| Isocyanate-terminated urethane prepolymer (A) | A-1 |
| Isocyanate-reactive compound (B) | B-9 |
| Castor oil polyol (b1)/Polyol (b2) + PTMG (b3) mass ratio | 38/62 |
| Average number of functional groups in castor oil polyol (b1) | 2.0 |
| Castor oil polyol (b1) content in polyurethane resin composition (mass %) | 28.8 |
| Density (g/cm$^3$) | 0.54 |
| Hardness (Asker C) | 68 |
| Tensile strength (MPa) | 3.2 |
| Tensile strength evaluation result | A |
| Elongation (%) | 390 |
| Elongation evaluation result | A |
| Tear strength (N/mm) | 13.1 |
| Tear strength evaluation result | A |
| Flexibility (growth of crack width · mm) | 4 |
| Flexibility evaluation result | A |
| Dimensional stability | A |

TABLE 2-1

|  | Comparative Example 1 | Comparative Example 2 | Comparative Example 3 | Comparative Example 4 |
|---|---|---|---|---|
| Two-part curable polyurethane foam resin composition | P-10 | P-11 | P-12 | P-13 |
| Isocyanate-terminated urethane prepolymer (A) | A-6 | A-7 | A-1 | A-1 |
| Isocyanate-reactive compound (B) | B-10 | B-11 | B-12 | B-13 |
| Castor oil polyol (b1)/Polyol (b2) + PTMG (b3) mass ratio | 40/60 | 39/61 | 66/34 | 100/0 |
| Average number of functional groups in castor oil polyol (b1) | 1.4 | 2.4 | 2.0 | 2.0 |
| Castor oil polyol (b1) content in polyurethane resin composition (mass %) | 28.9 | 28.4 | 47.3 | 22.0 |
| Density (g/cm$^3$) | 0.54 | 0.55 | 0.55 | 0.55 |
| Hardness (Asker C) | 65 | 64 | 64 | 65 |
| Tensile strength (MPa) | 1.9 | 1.8 | 2.3 | 2.2 |
| Tensile strength evaluation result | F | F | A | A |
| Elongation (%) | 480 | 310 | 320 | 330 |
| Elongation evaluation result | A | F | F | F |
| Tear strength (N/mm) | 10.4 | 11.0 | 9.7 | 10.4 |

TABLE 2-1-continued

|  | Comparative Example 1 | Comparative Example 2 | Comparative Example 3 | Comparative Example 4 |
|---|---|---|---|---|
| Tear strength evaluation result | A | A | F | A |
| Flexibility (growth of crack width · mm) | 2 | 20 | 20 | 12 |
| Flexibility evaluation result | A | F | F | F |
| Dimensional stability | A | A | A | F |

TABLE 2-2

|  | Comparative Example 1 |
|---|---|
| Two-part curable polyurethane foam resin composition | P-14 |
| Isocyanate-terminated urethane prepolymer (A) | A-1 |
| Isocyanate-reactive compound (B) | B-14 |
| Castor oil polyol (b1)/ Polyol (b2) + PTMG (b3) mass ratio | 100/0 |
| Average number of functional groups in castor oil polyol (b1) | 2.0 |
| Castor oil polyol (b1) content in polyurethane resin composition (mass %) | 22.9 |
| Density (g/cm$^3$) | 0.55 |
| Hardness (Asker C) | 64 |
| Tensile strength (MPa) | 2.5 |
| Tensile strength evaluation result | A |
| Elongation (%) | 325 |
| Elongation evaluation result | F |
| Tear strength (N/mm) | 10.9 |
| Tear strength evaluation result | A |
| Flexibility (growth of crack width · mm) | 16 |
| Flexibility evaluation result | F |
| Dimensional stability | F |

INDUSTRIAL APPLICABILITY

Since a two-part curable polyurethane foam resin composition according to the present invention uses little or no petroleum-derived raw materials conventionally used and a plant-derived raw material, i.e., a castor oil polyol, is used in both a main agent, i.e., an isocyanate-terminated urethane prepolymer (A), and a curing agent, i.e., an isocyanate-reactive compound (B), the biomass ratio can be improved, impact on the environment can be reduced, and excellent physical properties (strength, elongation, flexibility, dimensional stability, etc.) are exhibited when used in combination with polytetramethylene glycol. Accordingly, the composition can be applied to various types of molded articles, e.g., shoe soles of various types of footwear such as jogging shoes, sport shoes, chemical shoes, sandals, men's leather shoes, women's leather shoes, student shoes, medical shoes, and safety shoes, industrial components such as packings, hoses, sheets, and cushioning materials, decoration cushioning components such as furniture and mattresses, packaging components such as wrapping materials, and vehicle components such as vehicle bumpers and shock absorbers.

The invention claimed is:

1. A two-part curable polyurethane foam resin composition comprising a main agent that contains an isocyanate-terminated urethane prepolymer (A) and a curing agent that contains an isocyanate-reactive compound (B), water (C), and a catalyst (D), wherein the isocyanate-terminated urethane prepolymer (A) uses, as an essential component and as a polyol component to be reacted with a polyisocyanate (a1), a castor oil polyol (b1) having 1.5 to 2.3 functional groups on average; the isocyanate-reactive compound (B) uses, as essential components, the castor oil polyol (b1) and a polyol (b2) prepared by addition polymerization of lactone to polytetramethylene glycol and/or polytetramethylene glycol (b3); (b1) and (b2) and/or (b3) are contained in the polyurethane foam resin composition at a mass ratio of (b1)/(b2) and/or (b3)=15/85 to 60/40; and the content of the castor oil polyol (b1) in the polyurethane foam resin composition is 10 to 45% by mass.

2. The two-part curable polyurethane foam resin composition according to claim 1, wherein the isocyanate-terminated urethane prepolymer (A) is a prepolymer obtained from either the castor oil polyol (b1) having 1.5 to 2.3 functional groups on average alone or the castor oil polyol (b1) and the polyol (b2) prepared by addition polymerization of lactone to polytetramethylene glycol and/or polytetramethylene glycol (b3) by using 4,4'-diphenylmethane diisocyanate and/or a modified product thereof.

3. The two-part curable polyurethane foam resin composition according to claim 1, wherein an isocyanate group equivalent in the isocyanate-terminated urethane prepolymer (A) is 150 to 350.

4. The two-part curable polyurethane foam resin composition according to claim 1, wherein a hydroxyl value of the castor oil polyol (b1) is in the range of 40 to 180 mgKOH.

5. The two-part curable polyurethane foam resin composition according to claim 1, wherein a hydroxyl value of the polyol (b2) prepared by addition polymerization of lactone to polytetramethylene glycol or polytetramethylene glycol (b3) is in the range of 37 to 90 mgKOH.

6. The two-part curable polyurethane foam resin composition according to claim 1, wherein a lactone addition ratio in the polyol (b2) prepared by addition polymerization of lactone to polytetramethylene glycol is 5 to 50% by mass.

7. The two-part curable polyurethane foam resin composition according to claim 1, wherein an amount of water (C) blended is 0.01 to 1 part by mass and an amount of the catalyst (D) blended is 0.15 to 1.5 parts by mass relative to 100 parts by mass of the isocyanate-reactive compound (B).

8. A molded article produced from the two-part curable polyurethane foam resin composition according to any one of claims 1 to 7.

9. A shoe sole formed by using the two-part curable polyurethane foam resin composition according to any one of claims 1 to 7, wherein the density is in the range of 0.3 to 1.0 g/cm$^3$.

* * * * *